(12) United States Patent
Wang et al.

(10) Patent No.: US 9,053,369 B2
(45) Date of Patent: Jun. 9, 2015

(54) CONNECTOR WITH ARTICULATING ACTUATOR

(71) Applicant: Molex Incorporated, Lisle, IL (US)

(72) Inventors: Hong-Liang Wang, Chengdu (CN); Shang-Xiu Zeng, Chengdu (CN); Kian Heng Lim, Singapore (SG)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 14/134,416

(22) Filed: Dec. 19, 2013

(65) Prior Publication Data

US 2014/0206215 A1    Jul. 24, 2014

(30) Foreign Application Priority Data

Dec. 25, 2012 (CN) .......................... 2012 1 0570171

(51) Int. Cl.
*H01R 13/62* (2006.01)
*G06K 7/00* (2006.01)
*G06K 13/08* (2006.01)

(52) U.S. Cl.
CPC .......... *G06K 7/0069* (2013.01); *G06K 13/0818* (2013.01)

(58) Field of Classification Search
CPC ... H01R 13/62; H01R 13/633; G06K 13/0806
See application file for complete search history.

(56) References Cited

U.S. PATENT DOCUMENTS

| | | | |
|---|---|---|---|
| 6,027,350 A * | 2/2000 | Chen et al. | 439/159 |
| 7,011,537 B1 * | 3/2006 | Wu | 439/159 |
| 7,427,206 B2 * | 9/2008 | Takei et al. | 439/159 |
| 8,197,272 B2 | 6/2012 | Matsunaga | |
| 8,827,727 B2 * | 9/2014 | Yang et al. | 439/153 |

FOREIGN PATENT DOCUMENTS

CN     202172173 U     3/2012

* cited by examiner

*Primary Examiner* — Jean F Duverne
(74) *Attorney, Agent, or Firm* — Stephen L. Sheldon

(57) ABSTRACT

An electrical connector comprises a housing with a cage, a plurality of terminals and a card ejecting mechanism. The cage and the housing are assembled and together define a slot that an electronic card can move in and out along an inserting direction. The card ejecting mechanism is provided to the slot and adjacent to a side wall defining the slot and can move back and forth between a work position and a ejecting position along the inserting direction. The card ejecting mechanism comprises a driving rod and a controlling rod pivotally connected to the driving rod. When the card ejecting mechanism is positioned in the work position the majority of the controlling rod is positioned in the slot and cannot pivot outwardly and when the card ejecting mechanism is positioned in the ejecting position then the controlling rod can pivot outwardly.

14 Claims, 9 Drawing Sheets

CONNECTOR WITH ARTICULATING ACTUATOR

RELATED APPLICATIONS

This application claims priority to Chinese Application No. 201210570171.9, filed Dec. 25, 2012, which is incorporated herein by reference in its entirety.

TECHNICAL FIELD

The present disclosure relates to an electrical connector, and particularly relates to an electrical connector for electrically connecting an electronic card.

BACKGROUND ART

Mobile communication products generally require an SIM card to identify user data, and an electrical connector for electrically connecting the SIM card has two major types, i.e. a push-push type and a push-pull type. And, a volume of the push-push type electrical connector is large, and thus takes up more space for mounting, and the SIM card is inserted into and pulled out from the push-pull type electrical connector with a finger, however because the SIM card is getting smaller (transitioning from Mini SIM, Micro SIM to Nano SIM), attempting to grasp a SIM card with one's finger is becoming more difficult.

A U.S. Pat. No. 8,197,272 discloses a connector ejecting an SIM card with an ejection member. A main body portion of the ejection member is an elongated plastic bar, when the card is ejected, a force from a user for pulling out the main body portion will not be completely along a direction of ejecting the card, an improper force component transverse to the direction of ejecting the card is easily generated, so as to cause deformation or fracture of the elongated plastic bar. Furthermore, the connector of the above patent is not provided with a polarizing mechanism for preventing incorrect insertion of the electronic card and a mechanism for locking the SIM card to prevent the SIM card from loosening after the SIM card is inserted. Therefore, improvement is required.

SUMMARY OF THE INVENTION

Therefore, the electrical connector of the present disclosure comprises a housing having a bottom wall, a cage, a plurality of terminals, and a card ejecting mechanism. The cage is assembled with the housing to together define a slot and an insert entrance for moving in and out of the slot, so as to allow an electronic card to move in and out of the slot along an inserting direction. The plurality of terminals are fixedly provided in the bottom wall of the housing and partially protrude into the slot. The card ejecting mechanism is provided in the slot and is adjacent to a side wall defining the slot and extends along the inserting direction and is capable of moving back and forth between a work position and an ejecting position along the inserting direction. The card ejecting mechanism comprises a driving rod and a controlling rod pivotally connecting with the driving rod. The driving rod has a first rod body extending along the inserting direction, and an abutting portion extending transversely away from an end of the controlling rod from the first rod body and facing the insert entrance. The controlling rod has a second rod body extending along the inserting direction, and an operating portion formed at an end of the second rod body away from the driving rod for force application. When the card ejecting mechanism is positioned in the work position, the most part of the second rod body of the controlling rod is positioned in the slot and is not capable of swinging outwardly toward the side wall due to stopping from the side wall, and when the card ejecting mechanism is positioned in the ejecting position, the controlling rod is capable of swinging outwardly toward the side wall.

In an embodiment, the controlling rod further has a limiting portion protruding transversely from the operating portion and protruding in the same direction as the abutting portion, and the abutting portion and the limiting portion together limit movement of the electronic card along the inserting direction.

BRIEF DESCRIPTION OF THE DRAWINGS

The present invention is illustrated by way of example and not limited in the accompanying figures in which like reference numerals indicate similar elements and in which.

DETAILED DESCRIPTION OF THE PREFERRED EMBODIMENTS

Figure 1:
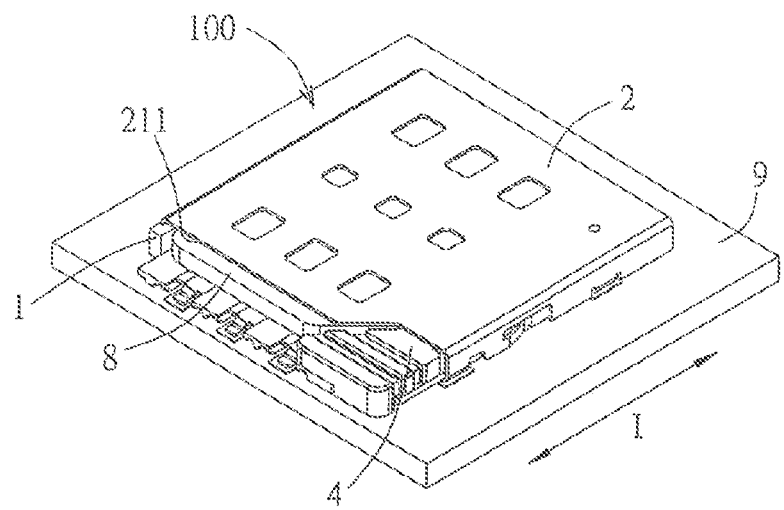
FIG. 1 is a perspective view illustrating a first embodiment of an electrical connector mounted to a circuit board for electrically connecting an electronic card.

The foregoing and other technical contents, features and effects of the present disclosure will be apparent through the following detailed description for two embodiments in combination with the Figures. Accordingly, one benefit of the present disclosure is that it can provide an electrical connector having a card ejecting mechanism which can avoid deformation or fracture caused by an improperly applied force.

Another benefit of the present disclosure is the electrical connector can prevent an electronic card from being incorrectly inserted. Another benefit of the present disclosure is the ability to provide an electrical connector which can lock an electronic card to avoid loosening of the electronic card.

As can be appreciated from the disclosure that follows, the card ejecting mechanism of comprises a driving rod and a controlling rod pivotally connecting with the driving rod, during the process of the card ejecting mechanism moving from the work position to an ejecting position. As long as the controlling rod is pulled out of the slot for a distance, the controlling rod can pivot to counteract a force component which is not applied along the inserting direction, so as to avoid the risk of deformation or fracture of the card ejecting mechanism caused by an improperly applied force. Furthermore, by virtue of a limiting portion of the controlling rod, the electronic card can be locked in the slot to prevent the electronic card from coming out, and the limiting portion also has the polarizing function to prevent the electronic card from being incorrectly inserted.

Referring to FIGS. 1-4, a first embodiment of an electrical connector 100 of the present disclosure is used to mount to a circuit board 9 and electrically connected to an electronic card 8, such as an SIM card. The electronic card 8, such as the SIM card, generally has a truncated corner 81.

The electrical connector 100 comprises a housing 1 (which can be formed of an insulative resin), a cage 2, a plurality of terminals 3 and a card ejecting mechanism 4. The cage 2 is assembled with the housing 1 to together define a slot 21 and an insert entrance 211 for moving into and out from the slot 21, so as to allow the electronic card 8 to move into and out from the slot 21 along an inserting direction I.

The housing 1 has a bottom wall 11, a first outer wall 12, a second outer wall 13 and a limiting wall 14 respectively protruding perpendicularly from the bottom wall 11 and extending along the inserting direction I, and a guide groove 15 provided in the bottom wall 11 and extending along the inserting direction I. The first outer wall 12 and the second outer wall 13 are respectively connected to two opposite side edges 111 of the bottom wall 11, and positioned opposite to each other at both sides of the bottom wall 11. The cage 2 has two side plates 22 latching on and engaging with the first outer wall 12 and the second outer wall 13, respectively, and a cover plate 23 connected to the two side plates 22 and facing the bottom wall 11 of the housing 1. In this way, the cage 2 and the housing 1 together define the slot 21.

The limiting wall 14 is spaced apart from the first outer wall 12 and the second outer wall 13, respectively, and the limiting wall 14 and the first outer wall 12 together define an area 212 receiving the electronic card 8, and the limiting wall 14 and the second outer wall 13 together define an area 213 receiving the card ejecting mechanism 4 and form rails for guiding the card ejecting mechanism 4 to move along the inserting direction I. That is, the limiting wall 14 divides the slot 21 into the area 212 receiving the electronic card 8 and the area 213 receiving the card ejecting mechanism 4 and limits the card ejecting mechanism 4 to move along the inserting direction I. The guide groove 15 is positioned between the limiting wall 14 and the second outer wall 13.

A plurality of terminals 3 are fixedly supported by the bottom wall 11 of the housing 1 and partially protrude into the slot 21. Each terminal 3 has a fixed portion 31 fixed to the bottom wall 11, a conducting portion 32 extending from the fixed portion 31 to electrically connect with the circuit board 9, a resilient arm 33 extending from the fixed portion 31 in a direction opposite to the conducting portion 32, and a contact portion 34 formed at a distal end of the resilient arm 33. As can be appreciated, the contact portion 34 protrudes into the slot 21.

The card ejecting mechanism 4 is provided in the slot 21 (positioned in the area 213) and adjacent to a side wall defining the slot 21 and extending along the inserting direction I, in the embodiment, the side wall is formed by the second outer wall 13 of the housing 1, and in an equivalent embodiment, the side wall can also be formed by the cage 2. The card ejecting mechanism 4 comprises a driving rod 41, a controlling rod 42 pivotally connecting with the driving rod 41, and a shaft 43 pivoting the driving rod 41 and the controlling rod 42. The driving rod 41 has a first rod body 411 extending along the inserting direction I, an abutting portion 412 extending transversely away from an end of the controlling rod 42 from the first rod body 411 and facing the insert entrance 211, and a first connecting portion 413 formed at an end of the first rod body 411 opposite to the abutting portion 412. The controlling rod 42 has a second rod body 421 extending along the inserting direction I, an operating portion 422 formed at an end of the second rod body 421 away from the driving rod 41 for force application, a limiting portion 423 protruding transversely from the operating portion 422 and protruding in the same direction as the abutting portion 412, a protruding block 424 protruding from the operating portion 422, and a second connecting portion 425 formed at an end of the second rod body 421 opposite to the operating portion 422.

As can be appreciated, the farther the limiting portion 423 is away from the driving rod 41, the more the limiting portion 423 protrudes from the operating portion 422, so as to form an oblique surface 426 facing toward the slot 21, and the oblique surface 426 corresponds to the truncated corner 81 of the electronic card 8 in position. The first connecting portion 413 and the second connecting portion 425 overlap each other and the shaft 43 is provided through the first connecting portion 413 and the second connecting portion 425, so as to connect the driving rod 41 and the controlling rod 42 together, and allow the controlling rod 42 to pivot relative to the driving rod 41. In addition, the bottom wall 11 of the housing 1 has a cutout 112 close to the insert entrance 211 for receiving the protruding block 424, and is formed with a stopping surface 113 perpendicular to the inserting direction I. As depicted, the limiting wall 14 has an end surface 141 facing the abutting portion 412. Furthermore, the first rod body 411 of the driving rod 41 has a recessed portion 414 positioned close to the abutting portion 412, and the cage 2 has a protruding portion 24 protruding from cover plate 23 toward the slot 21.

Referring to FIGS. 3-6, in an embodiment the first rod body 411 of the driving rod 41 is formed by stamping a metal sheet and substantially bent as a U-shape. An opening of the U-shape is positioned at the first connecting portion 413 so that the first connecting portion 413 is formed as two spaced-apart metal sheet bodies that can clamp the second connecting portion 425 of the controlling rod 42. The abutting portion 412 comprises a metal tab 4121 extending integrally with the first rod body 411 and a plastic block 4122 covering the metal tab 4121 by insert molding. The controlling rod 42 comprises a metal piece 44 and a plastic piece 45 covering the metal piece 44 by insert molding, and the metal piece 44 is annular at a location corresponding to the second connecting portion 425 and has a through hole 441. The shaft 43 is integrally formed with the plastic piece 45 and passes through the through hole 441 of the metal piece 44, and both ends of the shaft 43 respectively protrude from two opposite sides of the second connecting portion 425 and respectively pass through the through holes 4131 formed in the two metal sheet bodies of the first connecting portion 413. In the embodiment, the first rod body 411 is bent as the U-shape to form a double layer structure, which can strengthen structural strength, but it can be understood that, the first rod body 411 is a single layer can also be implemented.

Figure 8:
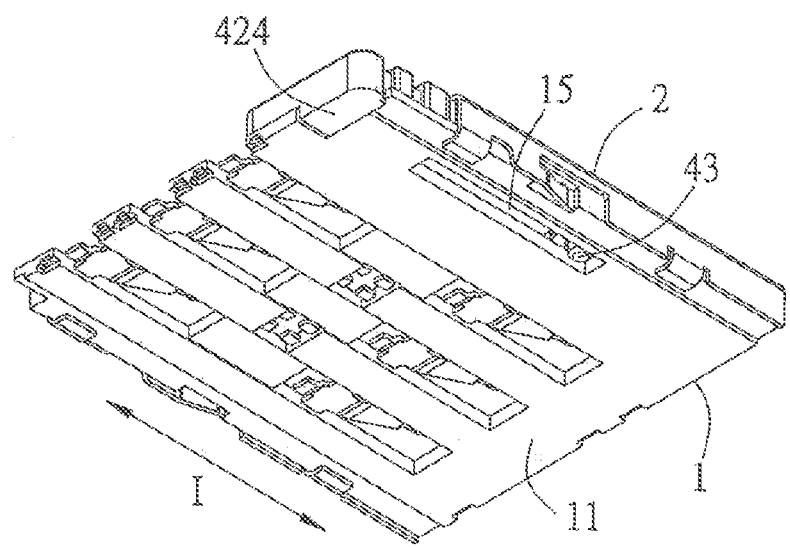
FIG. 8 is a perspective view illustrating a relationship between the card ejecting mechanism of the first embodiment and the housing in the work position.
Figure 9:
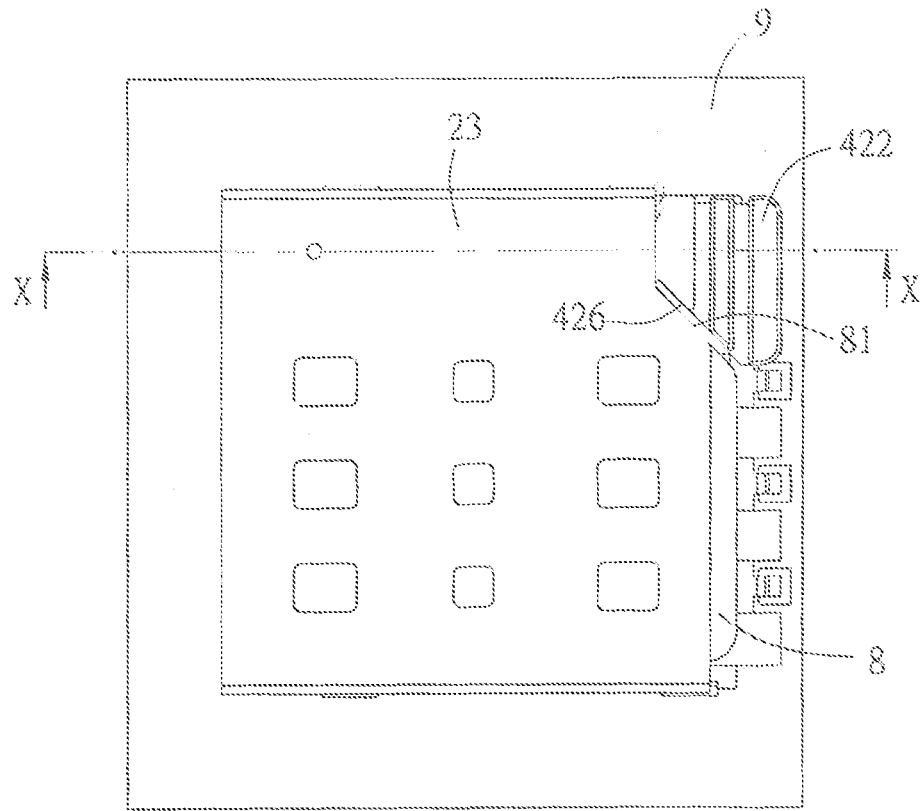
FIG. 9 is a top view of an embodiment of an electrical connector.
Figure 10:
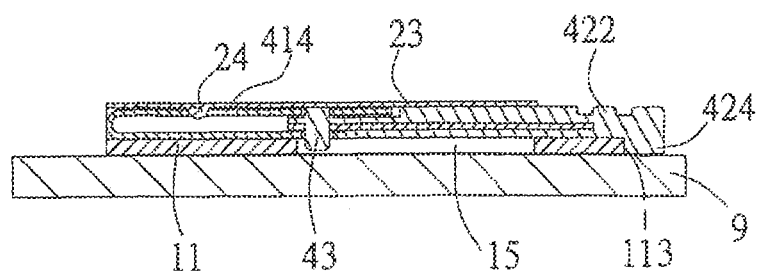
FIG. 10 is a cross-sectional view taken along a line X-X of FIG. 9 illustrating a relationship between the card ejecting mechanism of the first embodiment and the housing and the cage in the work position.
Figure 11:
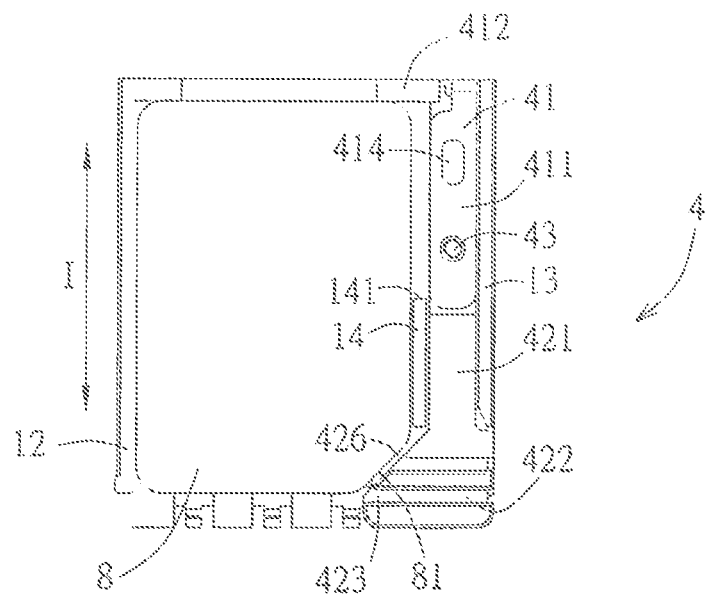
FIGS. 11-13 are top views, illustrating operations of the card ejecting mechanism of the first embodiment from the work position to a ejecting position and relationships between the card ejecting mechanism and the electronic card, with the cage of the first embodiment is not shown.
Figure 12:
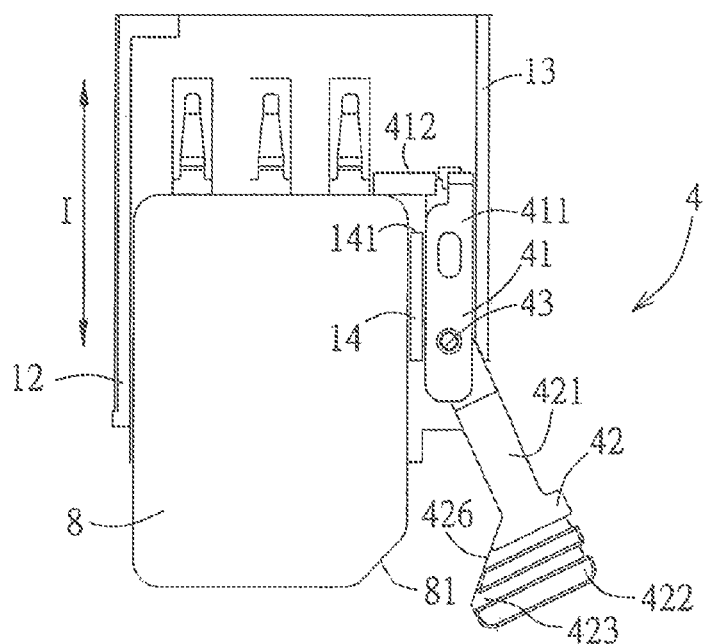
Figure 13:
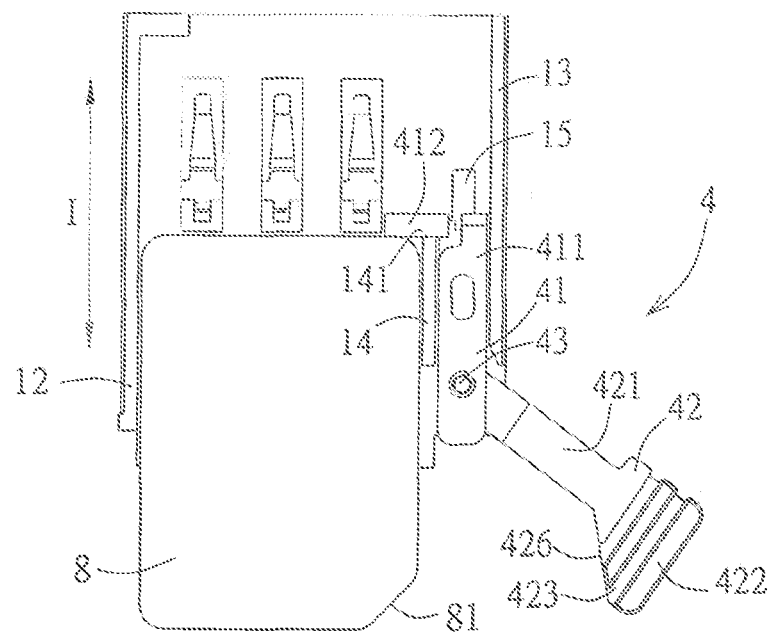

Referring to FIGS. 7-10, the card ejecting mechanism 4 is provided between the second outer wall 13 and the limiting wall 14. The shaft 43 of the card ejecting mechanism 4 extends into the guide groove 15 of the housing 1, so as to move back and forth along the inserting direction I under guiding of the guide groove 15. Referring to FIGS. 11-13, by virtue of the rails formed by the second outer wall 13 and the limiting wall 14, and the guiding of the guide groove 15, the card ejecting mechanism 4 can move back and forth between a work position (as shown in FIG. 11) and a ejecting position (as shown in FIG. 13) along the inserting direction I. When the card ejecting mechanism 4 is positioned in the work position, the driving rod 41 and the second rod body 421 of the controlling rod 42 are both positioned in the slot 21. As can be appreciated, the controlling rod 42 can not swing outwardly toward the second outer wall 13 due because the second outer wall 13 is in the way and cannot swing inwardly toward the slot 21 because of the limiting wall 14. In other words, the controlling rod 42 can not swing relative to the driving rod 41 due to the second outer wall 13 and the limiting wall 14, thus the position of the controlling rod 42 is controlled. And, as shown in FIG. 8 and FIG. 10, the protruding block 424 of the controlling rod 42 is received in the cutout 112 (referring to FIG. 4) of the housing 1 and abuts against the stopping surface 113, so as to limit the operating portion 422 to move inwardly toward the slot 21. In addition, the protruding portion 24 of the cage 2 is latched in the recessed portion 414 of the driving rod 41.

Further referring to FIG. 1 and FIG. 11, when the electronic card 8 is received in the slot 21, the card ejecting mechanism 4 is positioned in the work position, the abutting portion 412 of the driving rod 41 and the limiting portion 423 of the controlling rod 42 together limit movement of the electronic card 8 along the inserting direction I. And the oblique surface 426 formed by the limiting portion 423 is provided opposite to the truncated corner 81 of the electronic card 8, so as to prevent the electronic card 8 from ejecting from the slot 21, so as to lock the electronic card 8 in the slot 21.

Figure 2:
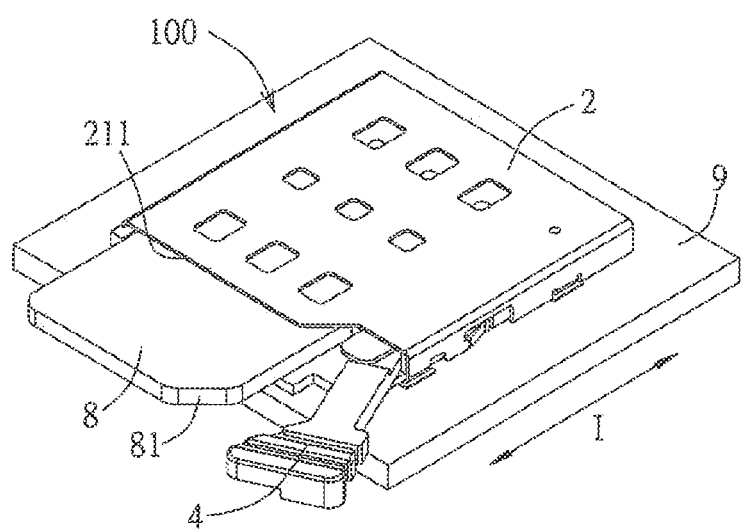
FIG. 2 is a perspective view illustrating a state of the first embodiment which is mounting or ejecting the electronic card.
Figure 3:
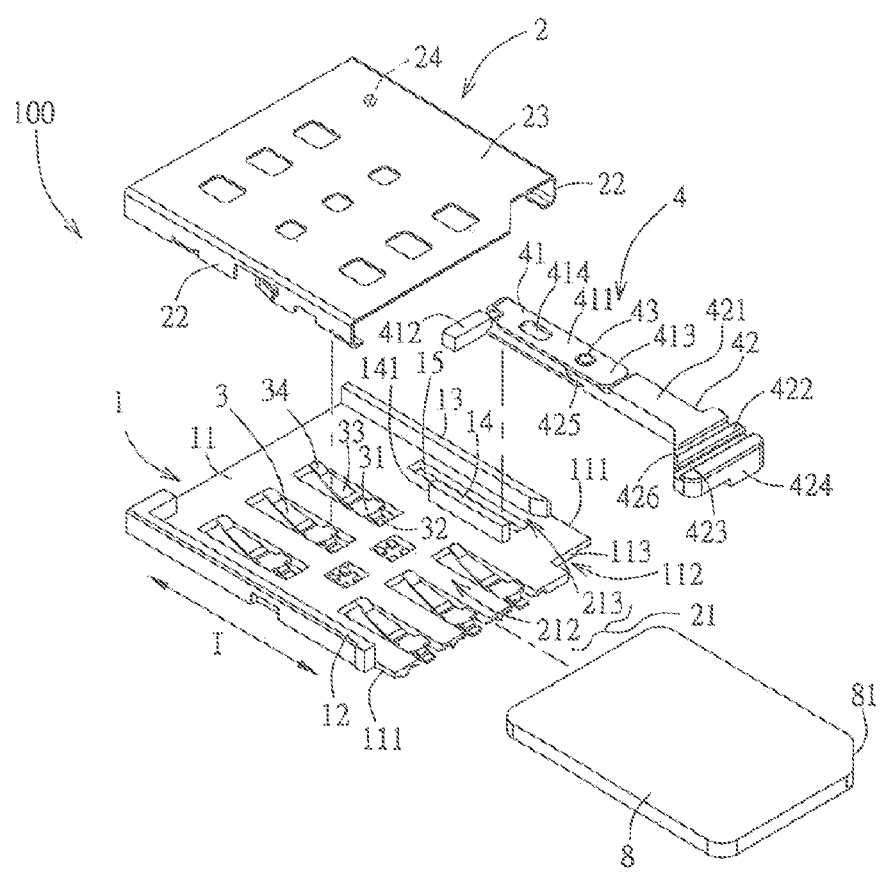
FIG. 3 is an exploded perspective view illustrating the first embodiment.
Figure 4:
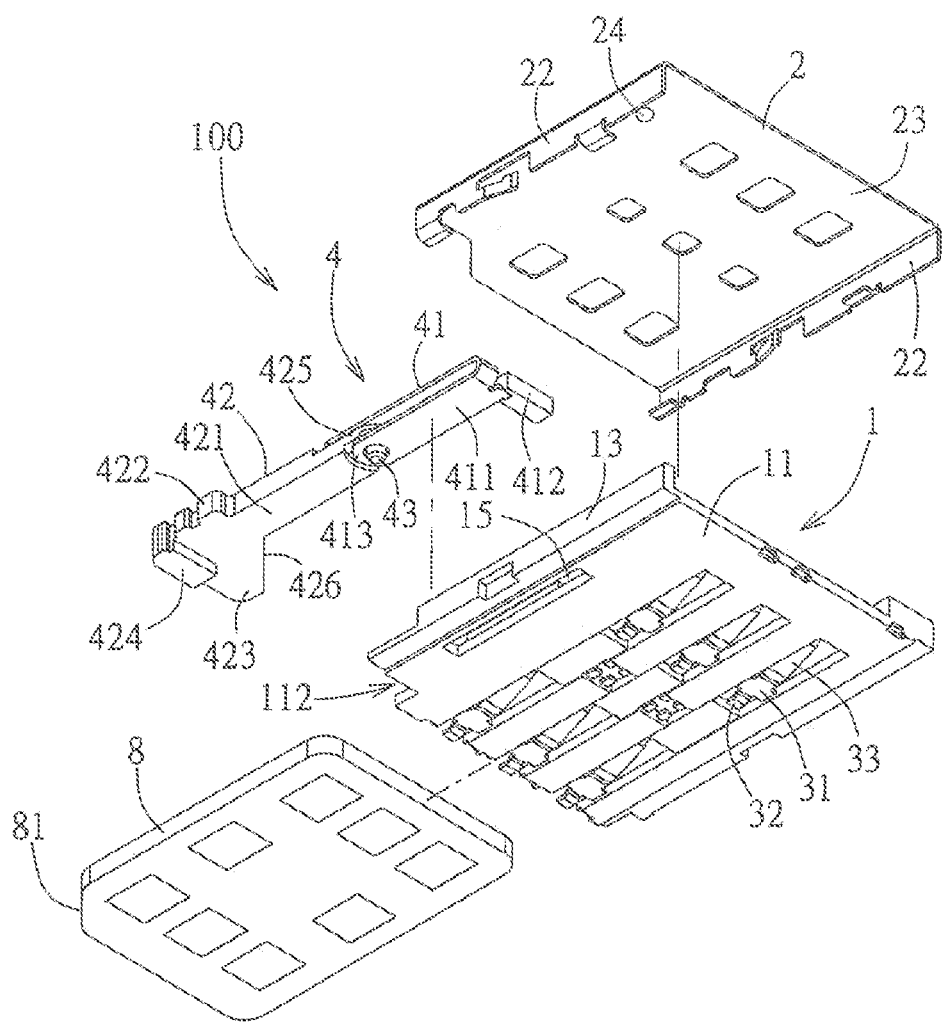
FIG. 4 is a view of FIG. 3 viewed from another angle.
Figure 5:
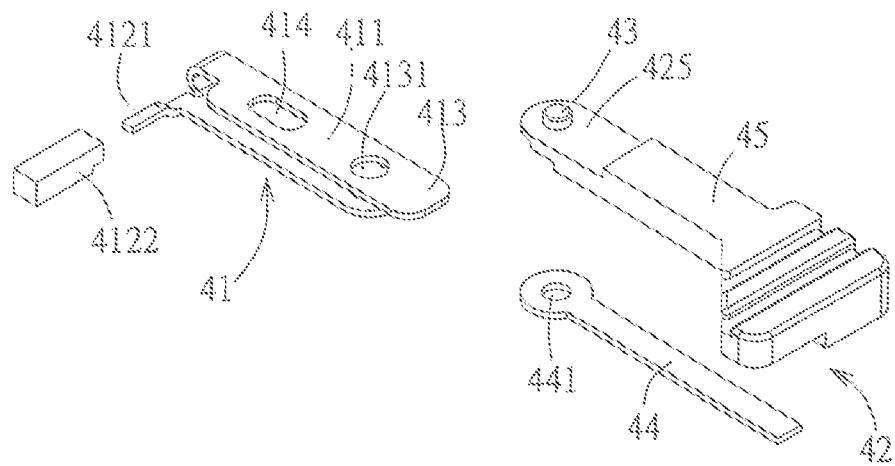
FIG. 5 is a perspective view illustrating a card ejecting mechanism of the first embodiment is formed by insert molding, and metal components and plastic components are shown separately.
Figure 6:
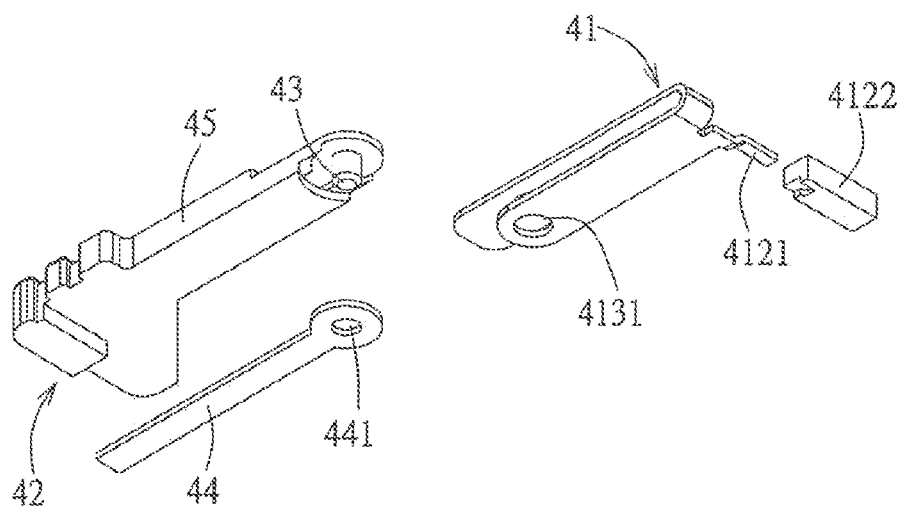
FIG. 6 is another perspective view of the embodiment depicted in FIG. 5.
Figure 7:
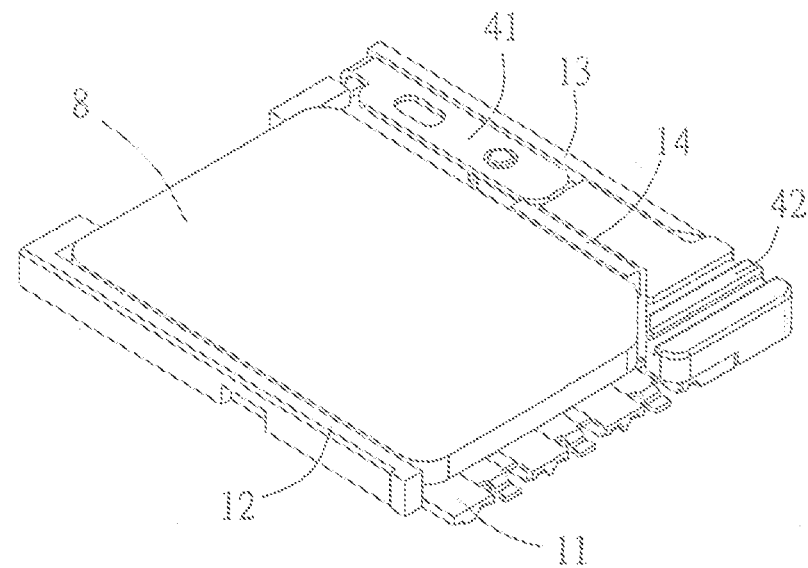
FIG. 7 is a perspective view illustrating the card ejecting mechanism of the first embodiment is in a work position and a relationship between the card ejecting mechanism and the electronic card, with the cage of the first embodiment is not shown.

Further referring to FIG. 2, FIG. 12 and FIG. 13, when the electronic card 8 will be ejected from the slot 21, a force applied via the operating portion 422 of the controlling rod 42 pulls the controlling rod 42 to pull the controlling rod 42 out of the slot 21, at the same time the driving rod 41 is driven by the controlling rod 42 to together move in the insert entrance 211 direction, and the abutting portion 412 of the driving rod 41 pushes the electronic card 8 to push the electronic card 8 out of the slot 21, so as to facilitate a user to remove the electronic card 8. During the process of the card ejecting mechanism 4 moving from the work position to the ejecting position, as shown in FIG. 12, as long as the controlling rod 42 is pulled for a distance and is not limited by the second outer wall 13, the controlling rod 42 can swing outwardly toward the second outer wall 13 to counteract a force component which is not applied along the inserting direction I, avoiding the risk of deformation or fracture of the card ejecting mechanism 4 caused by the force improperly applied. As shown in FIG. 13, when the card ejecting mechanism 4 is positioned in the ejecting position, the abutting portion 412 abuts against the end surface 141 of the limiting wall 14, so that the card ejecting mechanism 4 would not move outwardly toward the slot 21 excessively, and at this time the controlling rod 42 can swing in a relative large amplitude relative to the driving rod 41, so as to allow the limiting portion 423 away from the electronic card 8 without interfering the user to take out or put into the electronic card 8.

After the user takes out the electronic card 8, the card ejecting mechanism 4 can be pushed back to the work position, so as to receive and position the card ejecting mechanism 4. And when the user moves the card ejecting mechanism 4 from the ejecting position to the work position, the protruding portion 24 of the cage 2 will be latched in the recessed portion 414 (referring to FIG. 10) of the driving rod 41. It should be noted that at the moment of the protruding portion 24 is latched in the recessed portion 414, the user can appreciated a tactile feedback in the form of a sound or snap and this allows the user to ascertain that the position is reached and that additional force is not required, which helps ensure the card ejecting mechanism 4 reaches the desired position. Similarly, if the user will put the electronic card 8 into the slot 21, the card ejecting mechanism 4 is firstly required to move to the ejecting position, then the electronic card 8 is put in, next the electronic card 8 together with the card ejecting mechanism 4 are pushed into the slot 21, so as to allow the card ejecting mechanism 4 to move to the work position, namely the electronic card 8 can be locked in the slot 21.

Figure 14:
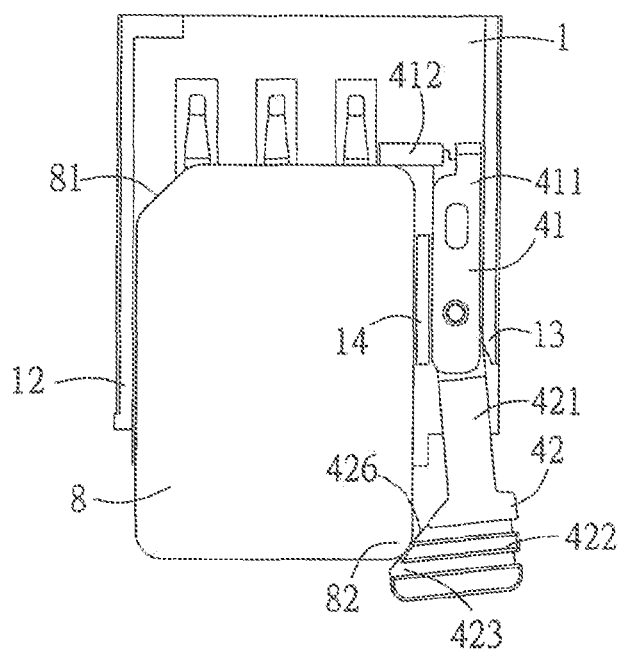
FIG. 14 is a top view illustrating the card ejecting mechanism of the first embodiment has a polarizing function.

Referring to FIG. 14, the card ejecting mechanism 4 also has a polarizing function for preventing incorrect insertion of the electronic card 8. When the electronic card 8 is inserted incorrectly and the truncated corner 81 faces toward an inner side of the slot 21, a right angle corner 82 of the electronic card 8 will abut against the oblique surface 426 of the controlling rod 42, causing skew of the second rod body 421 of the controlling rod 42 relative to the first rod body 411 of the driving rod 41 and not in a straight line, and then the second rod body 421 of the controlling rod 42 can not move into the slot 21 any longer due to stopping from the second outer wall 13. In this way, the user will know the electronic card 8 is being inserted incorrectly and requires adjustment and therefore the system helps avoid inserting the electronic card 8 incorrectly such that it cannot work.

In the embodiment, the limiting wall 14 of the housing 1 cooperates with the second outer wall 13 to serve as the rails for movement of the card ejecting mechanism 4, and the guide groove 15 also has the function of guiding the card ejecting mechanism 4, and if only one of the limiting wall 14 or the guide groove 15 is provided, the effect of guiding the card ejecting mechanism 4 to move straightly along the inserting direction I can also be achieved. And both ends of the guide groove 15 may also have a function of limiting movement of the card ejecting mechanism 4 along the inserting direction I. Specifically, the card ejecting mechanism 4 is stopped when the shaft 43 of the card ejecting mechanism 4 moves and reaches one end of the guide groove 15, therefore, by that a length of the guide groove 15 corresponds to a distance of the card ejecting mechanism 4 moving from the work position to the ejecting position, the card ejecting mechanism 4 can be limited to only move between the work position and the ejecting position. In addition, in an embodiment the driving rod 41 and the controlling rod 42 of the card ejecting mechanism 4 are formed by insert molding so that the structural strength of the card ejecting mechanism 4 is improved by virtue of the use of metal while parts of the abutting portion 412 and the limiting portion 423 (which will contact with the electronic card 8) are plastic so as to avoid an electrical short circuit. However, it should be noted that the card ejecting mechanism 4 can also formed entirely from plastic or entirely from metal. If the card ejecting mechanism 4 is formed entirely from metal then an insulating layer can be coated on the metal surface so as to avoid the electrical short circuit.

Figure 15:
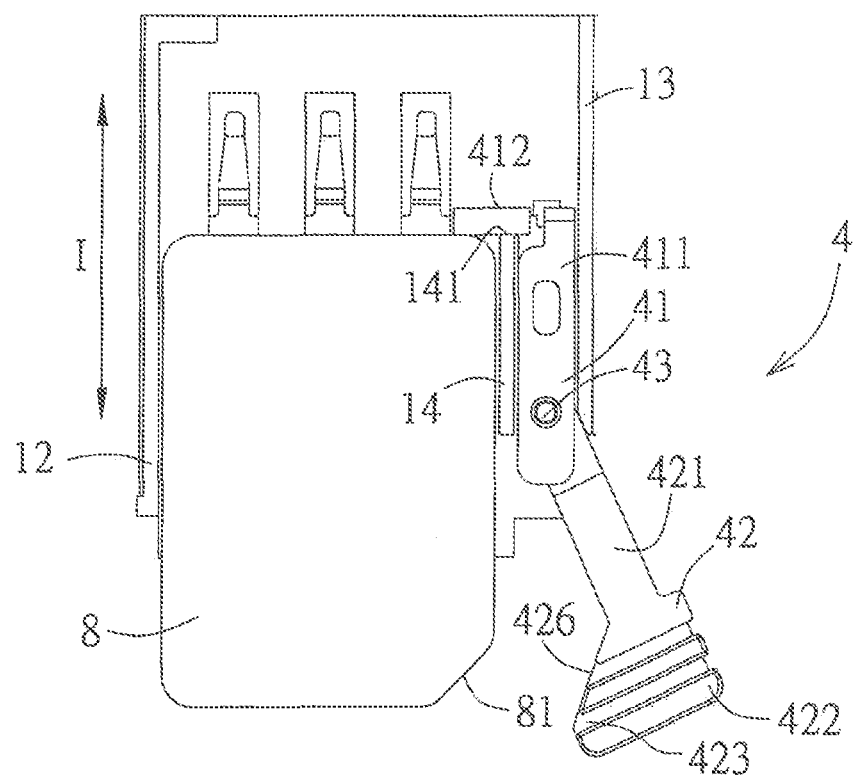
FIG. 15 is a view similar to FIG. 12 illustrating a second embodiment of an electrical connector.

Referring to FIG. 15, a second embodiment of the electrical connector 100 of the present disclosure is substantially the same as the first embodiment, however, in the second embodiment, the limiting wall 14 extends into the slot 21 further. When the card ejecting mechanism 4 is positioned in the ejecting position, namely the abutting portion 412 of the driving rod 41 abuts against the end surface 141 of the limiting wall 14, the controlling rod 42 is just not limited by the second outer wall 13 and can swing outwardly toward the second outer wall 13. In this way, limiting of the limiting portion 423 of controlling rod 42 on the electronic card 8 can be released, so as to facilitate taking out and putting in the electronic card 8. In other words, when the controlling rod 42 of the second embodiment can swing outwardly toward the second outer wall 13, the card ejecting mechanism 4 is stopped by the end surface 141 of the limiting wall 14, and can not move outwardly further. Nevertheless, as when the card ejecting mechanism 4 moves to the ejecting position, the controlling rod 42 can swing at the moment that the abutting portion 412 is stopped by the end surface 141 of the limiting wall 14, therefore, if a force component which is not applied along the inserting direction I is generated at the momentary pause when the user pulls the card ejecting mechanism 4 and is stopped, the force component can be also counteract by virtue of swinging of the controlling rod 42, so that it also avoid the risk of deformation or fracture of the card ejecting mechanism 4 caused by an improperly applied force.

In conclusion, the card ejecting mechanism 4 in the above embodiments comprises the driving rod 41 and the controlling rod 42 pivotally connected with the driving rod 41, during the process of the card ejecting mechanism 4 moving from the work position to the ejecting position, as long as the controlling rod 42 is pulled out of the slot 21 for a distance, the controlling rod 42 can rotate to counteract a force component applied in a direction different than inserting direction I so as to avoid the risk of deformation or fracture of the card ejecting mechanism 4 caused by a force improperly applied. Furthermore, by virtue of the limiting portion 423 of the controlling rod 42, the electronic card 8 can be locked in the slot 21 to prevent the electronic card 8 from coming out, and the limiting portion 423 also has the polarizing function to prevent the electronic card 8 from being incorrectly inserted. In addition, the card ejecting mechanism 4 in the above embodiments has good structural strength and can avoid the electrical short circuit.

However, what have been described as the above are only the embodiments of the present disclosure, which can not limit the scope of the implementation of the present disclosure, namely simple equivalent variations and modifications made according to the scope of the Claims and content of the present disclosure are still fallen within the scope of the Claims of the present disclosure.

What is claimed is:

1. An electrical connector comprising:
an housing having a bottom wall;
a cage assembled with the housing to define a slot and an insert entrance for moving in and out of the slot, so as to allow an electronic card to move in and out of the slot along an inserting direction;
a plurality of terminals fixedly provided to the bottom wall of the housing and partially protruding into the slot; and
a card ejecting mechanism provided to the slot and adjacent to a side wall defining the slot and extending along the inserting direction, the card ejecting mechanism configured to move back and forth between a work position and a ejecting position along the inserting direction, the card ejecting mechanism comprising a driving rod and a controlling rod pivotally connected with the driving rod, the driving rod having a first rod body extending along the inserting direction, and an abutting portion extending transversely away from an end of the controlling rod from the first rod body and facing the insert entrance, the controlling rod having a second rod body extending along the inserting direction, and an operating portion formed at an end of the second rod body away from the driving rod for force application, wherein positioning the card ejecting mechanism in the work position cases a substantial most part of the second rod body to be positioned in the slot so as to be blocked from pivoting outwardly toward the side wall due to the side wall, and wherein positioning the card ejecting mechanism in the ejecting position allows the controlling rod to pivot outwardly toward the side wall.

2. The electrical connector according to claim 1, wherein the housing further has an outer wall protruding perpendicularly from the bottom wall and extending along the inserting direction and the side wall is formed by the outer wall.

3. The electrical connector according to claim 1, wherein the housing has a guide groove provided in the bottom wall and extending along the inserting direction, the card ejecting mechanism further comprises a shaft pivoting the driving rod and the controlling rod and the shaft extends into the guide groove so as to move back and forth along the inserting direction under guiding of the guide groove.

4. The electrical connector according to claim 1, wherein the housing further has a limiting wall protruding perpendicularly from the bottom wall and extending along the inserting direction to divide the slot into the area receiving the electronic card and the area receiving the card ejecting mechanism and limit the card ejecting mechanism to move along the inserting direction, the limiting wall has an end surface facing the abutting portion, and when the card ejecting mechanism is positioned in the ejecting position, the abutting portion abuts against the end surface.

5. The electrical connector according to claim 1, wherein the housing further has a first outer wall, a second outer wall forming the side wall and a limiting wall respectively protruding perpendicularly from the bottom wall and extending along the inserting direction, the first outer wall and the second outer wall are respectively connected to two opposite side edges of the bottom wall, the limiting wall are spaced apart from the first outer wall and the second outer wall, respectively, and the limiting wall and the first outer wall together define an area receiving the electronic card, and the limiting wall and the second outer wall together define an area receiving the card ejecting mechanism and form rails guiding the card ejecting mechanism to move along the inserting direction, when the card ejecting mechanism is positioned in the work position, the controlling rod is limited by the second outer wall and the limiting wall and can not swing relative to the driving rod.

6. The electrical connector according to claim 5, wherein the limiting wall has an end surface facing the abutting portion, and when the card ejecting mechanism is positioned in the ejecting position, the abutting portion abuts against the end surface.

7. The electrical connector according to claim 5, wherein the housing further has a guide groove provided at the bottom wall and extending along the inserting direction, and the guide groove is positioned between the limiting wall and the second outer wall, the card ejecting mechanism further comprises a shaft pivoting the driving rod and the controlling rod, and the shaft extends into the guide groove, so as to move back and forth along the inserting direction under guiding of the guide groove.

8. The electrical connector according to claim 7, wherein the driving rod further has a first connecting portion formed at an end of the first rod body opposite to the abutting portion, the controlling rod further has a second connecting portion formed at an end of the second rod body opposite to the operating portion, the first connecting portion and the second connecting portion are overlapped, and the shaft is provided through the first connecting portion and the second connecting portion.

9. The electrical connector according to claim 8, wherein the first rod body of the driving rod is formed by stamping a metal sheet, and the abutting portion comprises a metal tab extending integrally with the first rod body and a plastic block covering the metal tab by insert molding, the controlling rod comprises a metal piece and a plastic piece covering the metal piece by insert molding, and the shaft is integrally formed with the plastic piece.

10. The electrical connector according to claim 8, wherein the first rod body of the driving rod has a recessed portion positioned close to the abutting portion and the cage has a protruding portion, when the card ejecting mechanism is positioned in the work position, the protruding portion is latched in the recessed portion.

11. The electrical connector according to claim 8, wherein the first rod body of the driving rod is formed by stamping a metal sheet and bent as a U-shape, and an opening of the U-shape is positioned at the first connecting portion, so that the first connecting portion is formed as two spaced-apart metal sheet bodies to clamp the second connecting portion of the controlling rod, and the abutting portion comprises a metal tab extending integrally with the first rod body and a plastic block covering the metal tab by insert molding, the controlling rod comprises a metal piece and a plastic piece covering the metal piece by insert molding, and the metal piece is annular at a location corresponding to the second connecting portion and has a through hole, the shaft is integrally formed with the plastic piece and passes through the through hole of the metal piece, and both ends of the shaft respectively protrude from two opposite sides of the second connecting portion and respectively pass through through holes formed in the two metal sheet bodies of the first connecting portion.

12. The electrical connector according to claim 1, wherein the controlling rod further has a limiting portion protruding transversely from the operating portion and protruding in the same direction as the abutting portion and the abutting portion and the limiting portion are configured to cooperatively limit movement of the electronic card along the inserting direction.

13. The electrical connector according to claim 12, wherein the electronic card has a truncated corner and the farther the limiting portion is away from the driving rod, the more the limiting portion protrudes from the operating portion, so as to form an oblique surface corresponding to the truncated corner in position.

14. The electrical connector according to claim 12, wherein the bottom wall of the housing has a cutout close to the insert entrance and is formed with a stopping surface perpendicular to the inserting direction; the controlling rod further has a protruding block protruding from the operating portion, when the card ejecting mechanism is positioned in the work position, the protruding block is received in the cutout and abuts against the stopping surface to limit the operating portion to move inwardly toward the slot.

* * * * *